United States Patent Office
2,888,410
Patented May 26, 1959

2,888,410

PROCESS OF MANUFACTURING EXPANDABLE GRANULES OF A POLYVINYL COMPOUND

Karl Buchholz, Ludwigshafen (Rhine), Germany, assignor to Badische Anilin- & Soda-Fabrik Aktiengesellschaft, Ludwigshafen (Rhine), Germany No Drawing. Application August 17, 1955
Serial No. 529,082

Claims priority, application Germany August 19, 1954

6 Claims. (Cl. 260—2.5)

This invention relates to a process of polymerizing unsaturated organic compounds in aqueous suspension. More particularly, the invention is directed to a polymerizing process in aqueous suspension wherein particular copolymers of N-vinylpyrrolidone-2 are used as suspending agent.

It is well known to polymerize water insoluble unsaturated organic compounds in aqueous suspension while the reaction medium is rapidly agitated. To facilitate and to stabilize the dispersion of the monomeric compounds in the aqueous phase, suspending agents, such as suspensions of water insoluble fine solids or water soluble protective colloids or soluble inorganic salts, are added. The granular polymers obtained often have the form of beads or pearls, and therefore the suspension polymerization is also known as granular, bead or pearl polymerization. Suitable monomers for the suspension polymerization are unsaturated polymerizable organic compounds in which the formed polymer is soluble, for instance, styrene, acrylic esters and vinyl esters.

As protective colloids for the suspension polymerization, several organic macromolecular compounds which have a good solubility in water have already been used, such as starch, polyvinyl alcohol, salts of polyacrylic acid, gelatin, poly-N-vinylpyrrolidone, copolymers of N-vinyl-pyrrolidone and methacrylic acid amide, methylcellulose and other macromolecular compounds. Poly-N-vinylpyrrolidone is a very efficient suspending agent and yields even in relatively small concentrations, for instance, in concentrations of 0.25 to 0.30% by weight with reference to the weight of the organic unsaturated compounds to be polymerized, suspensions which are completely stable during the entire polymerization reaction even if higher pressures and temperatures over 100° C. are used.

If styrene is polymerized in aqueous suspension while poly-N-vinylpyrrolidone is employed as suspending agent, the polystyrene is obtained in the form of small beads having an average diameter between 0.3 and 0.5 mm., the smallest beads having a diameter smaller than 0.1 mm. and the largest beads a diameter between 1 and 2 mm. In addition, about 3 to 6% of a non-globular, flocculent polymer called "coagulate" herein is formed.

The relatively low particle size of the polymer granules obtained by the process above described is disadvantageous for many uses of polymers. The small particle size of the polymers is disadvantageous for several methods of processing the polymers into articles; thus, during injection molding, the easily flowing polymer causes difficulties during the filling of the mass cylinder. The finest polymer granules slip easily between the cylinder wall and the piston of the injection molding machine and thereby block the piston. The fact that a mass of such small beads begins to flow at an angle as low as about 12° C. is very undesirable for the transport of the polymers, since a damaged package of these polymers spills out completely in a short time.

It is desirable therefore to produce by suspension polymerization granules having a larger particle size. In known methods, the particle size of the polymer beads can be modified by changing either the concentration of the protective colloids, the number of revolutions of the stirrer employed to agitate the reaction medium, or the viscosity of the monomer by dissolving a certain amount of polymer in the monomer. All these measures are, however, of very limited influence when poly-N-vinylpyrrolidone is used as suspending agent, since the suspensions soon become very unstable if the optimum conditions which yield beads of a small diameter are changed. If, for instance, the concentration of poly-N-vinylpyrrolidone is diminished or the number of revolutions of the stirrer is decreased in order to produce beads with a larger diameter, for instance, of a diameter between 1 and 3 mm., the suspension usually breaks. Such a method is therefore without industrial interest.

When copolymers of N-vinylpyrrolidone and methylacrylic acid amide are employed as suspending agent, the polymer is obtained so finely dispersed that the suspension resembles externally a dispersion obtained by emulsion polymerization.

It is an object of the invention therefore to provide a process of polymerizing unsaturated organic compounds in aqueous suspension which yields granules having a larger particle size.

Another object is to provide a method for polymerizing unsaturated water soluble organic compounds in aqueous suspension while particular N-vinylpyrrolidone-copolymers are used as suspending agent.

A further object is to supply a method of manufacturing large granules of a vinyl polymer containing an easily volatile organic liquid by polymerizing in aqueous suspension monomeric compounds containing the radical $CH_2=C<$ while using particular N-vinylpyrrolidone copolymers as suspending agent.

Other objects, advantages and functions will appear from the more detailed description of the invention.

These objects are accomplished according to this invention by polymerizing an unsaturated organic compound which is liquid under the polymerization conditions and insoluble in water in aqueous suspension in the presence of a water soluble copolymer of N-vinylpyrrolidone-2 and of a minor amount of an ester of an acrylic acid as suspending agent.

The outstanding feature of this process consists in the fact that by varying the concentration of the suspending agent and/or the degree of agitation of the reaction medium, beads of polymers or copolymers can be obtained having an average diameter falling within the range of about 0.4 mm. to about 8 to 10 mm. The size of the beads can be adjusted reproducibly as desired between these limits by adjusting the concentration of the suspending agent and/or the degree of agitation. The suspensions have an excellent stability even at higher temperatures.

Suitable suspending agents according to the invention are copolymers of N-vinylpyrrolidone-2 and esters of acrylic acid or methylacrylic acid. Preferred are those esters which are esterification products of an acrylic acid and a saturated lower aliphatic monoalcohol, said alcohol radical containing advantageously between 1 to 4 carbon atoms. The best results are obtained with copolymers of the methyl and ethyl esters of the acrylic acids. The copolymers can also contain several acrylic acid esters.

As a rule, the copolymer should contain about 0.1 to 15% by weight of the acrylic ester with reference to the total weight of the copolymer, the balance being N-vinylpyrrolidone-2. The maximum content of the acrylic ester is that at which the copolymer is still water-soluble. The optimum content of acrylic esters depends on the chain length of the alcohol radical of the ester, a longer alcohol radical requiring a lower ester content, and a shorter alcohol radical a higher ester content. For example, the content of the methyl, ethyl and butyl esters of acrylic acids may be varied preferably within the following limits:

| | Percent |
|---|---|
| Acrylic acid methylester | 1 to 8 |
| Acrylic acid ethylester | 0.5 to 4 |
| Acrylic acid butylester | 0.25 to 2.5 |

The copolymers of N-vinylpyrrolidone and an ester of an acrylic acid may be prepared according to known methods by copolymerizing the corresponding monomers in bulk or preferably in aqueous solution as will be illustrated in detail in Examples 1 and 2. The resulting copolymer suspending agent should preferably have a molecular weight between about 200,000 and 500,000 according to Staudinger (Berichte der Deutschen Chemischen Gesellschaft, 68, 1935, Seite 2320). As a rule, about 0.1 to about 0.5% of the copolymers is employed, with reference to the weight of the unsaturated compound to be polymerized. Copolymers of a lower molecular weight, for instance, having a molecular weight of 15,000 or 40,000 may also be used, but relatively high amounts of such copolymers are required in order to obtain stable suspensions. The use of copolymers having a molecular weight higher than 500,000 is possible, but no particular advantage is achieved with such higher molecular copolymers.

As a rule, the phase ratio between water and the water insoluble unsaturated compounds to be polymerized can be varied between 4:1 and 1:2. The aqueous phase may also contain salts and/or water soluble organic liquids. The reaction mixture is preferably stirred in order to agitate it rapidly and to form and maintain thereby a suspension of the organic phase in the external or continuous aqueous phase. The form of the stirrer and the number of revolutions is adapted according to known rules to the shape of the reaction vessel, the concentration of the suspending agent and the nature of the monomeric compounds. Generally, stirrers with about 80 to 350 revolutions per minute are used.

Unsaturated organic compounds which may be polymerized according to the invention in aqueous suspension are preferably monovinyl compounds, such as the ester of an acrylic acid, for instance, methacrylic acid methylester or a styrene, for instance, styrene or ring- or alpha-substituted styrenes, such as ring-, mono- or dimethyl styrene, alpha-methylstyrene, and meta-ethyl styrene, alkoxy styrenes and chloro-styrenes. These monomers may be homopolymerized or copolymerized with one another or with other polymerizable compounds, the copolymers containing preferably at least 10–50% by weight of one of said monomers. Other monomeric compounds containing the group $CH_2=C<$ which may be copolymerized with a styrene are, for instance, acrylonitrile, N-vinyl carbazole, vinylidene chloride or methylacrylic acid methyl ester. The other polymerization conditions are conventional. As polymerization initiators there may be used organic peroxides, such as benzoyl peroxide or other peroxides soluble in the monomers or other radical forming initiators, for instance, azo compounds, such as azo isobutyronitrile. The polymerization may be carried out under normal or increased pressure and additives, such as plasticizers, flame retarders, or white or colored pigments may be added to the monomers.

Of particular interest is the addition of easily volatile non-polymerizable organic liquids to the monomers for manufacturing relatively large polymer granules containing these liquids in homogeneous dispersion within the granules. Such polymer particles can be used for the production of porous masses by heating them to a temperature above the boiling point of the organic liquid which serves as a blowing agent and above the softening range of the polymer. The boiling point of the volatile liquids preferably should be lower than the softening range of the polymer. As such liquid blowing agents for polymers and copolymers of styrene or for methacrylic methyl ester, in particular, liquids, which are non-solvents for the polymers, such as easily volatile saturated aliphatic or cyclo-aliphatic hydrocarbons boiling between about 0° C. and 60° C., for instance, butane or pentane, their mixtures with hexane, for instance, petroleum ether, with cyclohexane or with hexane and cyclohexane are suitable.

In order to manufacture polymer granules containing a liquid blowing agent, as a rule, from about 1 to about 15% preferably about 5 to 10% by weight of the easily volatile liquid with reference to the weight of the monomeric vinyl compound, are added to the monomeric compound. The mixture of the monomer and the easily volatile liquid is then suspended in the aqueous phase containing the suspending agent employed in this invention and polymerized preferably at a temperature between 30° and 100° C. It is preferable to carry out the polymerization under increased pressure in the presence of an inert gas, for instance, under a nitrogen pressure between 3 and 10 atmospheres, to avoid the evaporation of the liquid blowing agent during the polymerization. For the production of porous masses, in particular, polymers containing about 50 to 70% of a styrene or of methacrylic acid methylester and about 50 to 30% of another monomeric compound containing the group $CH_2=C<$ are of interest.

The polymer granule prepared according to the invention often has not the form of beads or pearls but of lenses or beams.

The following examples are given in order to illustrate but not to limit the invention. The parts are by weight.

*Example 1*

A solution of 800 parts of water
10 parts of ammonia (25 percent strength)
190 parts of N-vinylpyrrolidone-2
10 parts of acrylic acid methylester and
0.5 part of azo-bis-isobutyric acid nitrile is charged in a stirring autoclave, placed under a nitrogen pressure of 2 atmospheres and heated to 70° C. while stirring. When the polymerization has started care should be had by intense cooling that the temperature of the reaction mixture does not exceed substantially 85° C. After having been heated at 85° C. for about 5 hours, the mixture is heated to 90°–95° C. and kept at this temperature for one more hour. After cooling and decompression the aqueous solution of the polymers can be used directly as a protective colloid in the process of polymerizing unsaturated organic compounds in aqueous suspension.

*Example 2*

A solution of 800 parts of water
15 parts of ammonia (10 percent strength)
1.2 parts of hydrogen peroxide (30 percent strength)
197 parts of N-vinylpyrrolidone-2, and
3 parts of methacrylic acid methyl ester is heated to 80° C. for 4 hours under the conditions specified in Example 1. Then 0.5 part of hydrogen peroxide (30% strength) in 2 parts of water are added and the polymerization is continued at 85° to 90° C. for 4 hours. The solution of the copolymer can be used directly as a protective colloid in the suspension polymerization.

Example 3

In an autoclave provided with a paddle stirrer are introduced.

3000 parts of water
1.8–3.2 parts of a suspending agent (a) or (b)
1 part of sodium pyrophosphate
1000 parts of styrene
3 parts of benzoyl peroxide.

The styrene is polymerized by heating the mixture for 30 hours at 70° C. and 10 hours at 80° C. while stirring (316 revolutions per minute of the stirrer). The polymer obtained is centrifuged, washed and dried.

The following comparison shows the influence of the different suspending agents (a) and (b) in different concentrations.

(a) Suspending agent=poly-N-pyrrolidone-2 with a molecular weight of 220,000 according to Staudinger:

| Amount of Suspending Agent with reference to the weight of Styrene | Average Particle Size of the Polymer Granules, mm. | Remarks |
| --- | --- | --- |
| 0.18% | 0.6–0.8 | Relatively few coagulate, particle size difficulty reproducible. |
| 0.24% | 0.3–0.5 | Relatively much coagulate. |
| 0.32% | 0.1–0.4 | Much coagulate. |

(b) Suspending agent=a copolymer of 95% by weight N-vinyl-pyrrolidone-2 and 5% acrylic acid methyl ester having a molecular weight of about 210,000 according to Staudinger:

| Amount of Suspending Agent with reference to the weight of Styrene | Average Particle Size of the Polymer Granules, mm. | Remarks |
| --- | --- | --- |
| 0.18% | 4–6 | Practically no coagulate, granules mostly lens shaped. |
| 0.24% | 2–5 | Very few coagulate, granules mostly lens shaped. |
| 0.32% | 0.8–1.8 | Few coagulate, granules mostly ball shaped. |

The phase ratio, water to styrene, was 3:1 for both (a) and (b). If less water and more styrene is used, the average particle size of the polymer granules is slowly increased until a ratio 1:2 is reached. If the amount of styrene or another vinyl compound is further increased, the particle size of the granules increases relatively rapidly. The suspension becomes, however, more and more unstable. This influence of the phase ratio also applies to the following examples.

When using a copolymer of 97.5 parts of N-vinyl-pyrrolidone-2 and 2.5 parts of methacrylic acid methyl ester instead of the copolymer of 95 parts of N-vinyl-pyrrolidone-2 and 5 parts of acrylic acid methyl ester well-formed granules are likewise obtained.

Example 4

If methacrylic acid methyl ester is polymerized instead of styrene under the same conditions as described in Example 3, polymer granules of polymethacrylic acid methyl ester are obtained having practically the same size as the polystyrene granules of Example 3.

Example 5

3000 parts of a 14% sodium chloride solution in water
3.2 parts of suspending agent (a) or (c)
700 parts of styrene
300 parts of acrylonitrile
3 parts of benzoyl peroxide are polymerized in aqueous suspension as described in Example 3.

(a) Suspending agent=poly-N-vinylpyrrolidone-2 as in Example 3.
(c) Suspending agent=copolymer of 98% N-vinylpyrrolidone-2 and 2% acrylic acid ethyl ester having a molecular weight of about 250,000 according to Staudinger.

The granules of copolymerized styrene and acrylonitrile have an average particle size of 0.2–1.0 mm. with suspending agent (a), and 1–4 mm. with suspending agent (c).

If a plasticizer and/or a low boiling organic liquid which swells but does not dissolve the polymer to be formed is added to the monomer, granules of the polymer having a similar particle size are obtained, and the granules contain the plasticizer or organic liquid homogeneously dispersed throughout.

Example 6

500 parts of water
0.6 part of a copolymer of 95% N-vinylpyrrolidone-2 and 5% acrylic acid methyl ester with a molecular weight of about 200,000 according to Staudinger
100 parts of styrene
16 parts of pentane dissolved in the styrene
0.6 part of benzoyl peroxide are polymerized in an autoclave provided with a paddle stirrer (100 revolutions per minute) under a nitrogen pressure of 4 atmospheres for 30 hours at a temperature of 70° C. After the polymerization, the reaction mixture is cooled down, the pressure is released and the polymer particles are separated from the liquid phase. A from ball to lens shaped granular polystyrene with an average particle size between 2.0 and 5.0 mm. is obtained which contains the pentane blowing agent dispersed within the granules.

If 20 parts of hexachloroethane are dissolved in the 200 parts of styrene before the styrene is suspended in the aqueous phase and the polymerization is carried out under the same conditions, flame resistant kidney shaped polymer granules having a particle size between 2 and 4 mm. are obtained.

Example 7

In an autoclave provided with a stirrer (115 revolutions per minute) are introduced 400 parts of water
1–4 parts of a copolymer of 94% by weight of N-vinyl-pyrrolidone-2 and 6% acrylic acid methyl ester
300 parts of styrene
100 parts of alpha-methylstyrene
0.6 part of benzoyl peroxide
0.6 part of di-tertiary-butyl peroxide.

The polymerization is carried out for 6 hours at a temperature of 90° C. Egg-shaped granules of copolymerized styrene and alpha-methylstyrene having an average particle size between 2 and 4 mm. are obtained.

Example 8

In an autoclave provided with a stirrer (300 revolutions per minute) are introduced 3000 parts of water
2.5 parts of a copolymer of 97.5% of N-vinylpyrrolidone-2 and 2.5% of acrylic acid ethyl ester
1000 parts of 1-vinyl-2,4-dimethylbenzene
70 parts of pentane, and
4 parts of benzoyl peroxide.

The polymerization is carried out under nitrogen pressure of 4 atmospheres for 30 hours at 70° C. and for 10 hours at 90° C. The polymer obtained is worked up as in Example 6. The polymer particles are of a kidney shape, have an average particle size between 1.5 and 3.5 mm., and contain pentane dispersed throughout.

I claim:
1. A process of manufacturing an expandable granu- lar vinyl polymer containing in homogeneous distribution an easily volatilized organic liquid which comprises polymerizing in aqueous suspension at least one monovinyl compound which is insoluble in water and is liquid under the polymerization conditions, said monovinyl compound containing about 1 to 15% by weight thereof of an inert organic volatile liquid in which said vinyl polymer is insoluble and which has a boiling point lower than the softening range of the polymer to be formed, while rapidly agitating the polymerization medium and in the presence of about 0.1 to about 0.5% by weight with respect to said monovinyl compound of a copolymer of N-vinylpyrrolidone-2 and an ester of an acrylic acid with a lower alkyl monoalcohol containing from 1 to 4 carbon atoms as a suspending agent, said N-vinylpyrrolidone-2 copolymer containing the ester in a range of from about 1 to 8%, by weight with respect to the copolymer, of the methyl ester to about 0.25 to 2.5%, by weight with respect to the copolymer, of the butyl ester.

2. A process of manufacturing an expandable granular styrene polymer containing in homogeneous distribution an easily volatilized organic non-solvent liquid which comprises polymerizing in aqueous suspension a styrene containing about 1 to 15% by weight thereof of an inert organic volatile liquid in which styrene polymers are insoluble and which has a boiling point lower than the softening range of the styrene polymer to be formed, while rapidly agitating the polymerization medium and in the presence of about 0.1 to about 0.5% by weight with reference to styrene of a copolymer of N-vinylpyrrolidone and an ester of an acrylic acid with a lower alkyl monoalcohol containing from 1 to 4 carbon atoms as a suspending agent, said N-vinylpyrrolidone copolymer containing the ester in a range of from about 1 to 8%, by weight with respect to the copolymer, of the methyl ester to about 0.25 to 2.5%, by weight with respect to the copolymer, of the butyl ester.

3. A process of manufacturing expandable granules of polystyrene containing in homogeneous distribution an easily volatilized organic liquid which comprises polymerizing styrene in aqueous suspension, said styrene containing about 5 to 10% by weight thereof of a liquid hydrocarbon selected from the class consisting of aliphatic and cycloaliphatic hydrocarbons boiling between about 0° C. and 60° C., while rapidly agitating the polymerization medium and in the presence of about 0.1 to 0.5% by weight with reference to styrene of a copolymer of N-vinylpyrrolidone-2 and an ester of an acrylic acid with a lower alkyl monoalcohol containing from 1 to 4 carbon atoms as a suspending agent, said N-vinylpyrrolidone-2 copolymer containing the ester in a range of from about 1 to 8%, by weight with respect to the copolymer, of the methyl ester to about 0.25 to 2.5% by weight with respect to the copolymer, of the butyl ester.

4. A process of manufacturing expandable granules of polystyrene containing in homogeneous distribution an easily volatilized organic liquid which comprises polymerizing styrene in aqueous suspension, said styrene containing about 5 to 10% by weight thereof of a liquid hydrocarbon selected from the class consisting of aliphatic and cycloaliphatic hydrocarbons boiling between about 0° C. and 60° C., while rapidly agitating the polymerization medium and in the presence of about 0.1 to 0.5% by weight with reference to styrene of a water-soluble copolymer of N-vinylpyrrolidone-2 and from about 1 to about 8%, by weight of the copolymer, of acrylic acid methyl ester as suspending agent.

5. A process as claimed in claim 2 wherein the suspending agent is a water-soluble copolymer of N-vinylpyrrolidone-2 and from about 1.5 to about 4%, by weight of the copolymer, of acrylic acid ethyl ester.

6. A process as claimed in claim 2 wherein the suspending agent is a water-soluble copolymer of N-vinylpyrrolidone-2 and from about 0.25 to 2.5%, by weight of the copolymer, of acrylic acid butyl ester.

References Cited in the file of this patent

UNITED STATES PATENTS

| | | |
|---|---|---|
| 2,133,257 | Strain | Oct. 11, 1938 |
| 2,335,454 | Schuster et al. | Nov. 30, 1943 |
| 2,470,911 | Baer | May 24, 1949 |
| 2,486,855 | Lavin et al. | Nov. 1, 1949 |
| 2,545,702 | Norris | Mar. 20, 1951 |
| 2,555,286 | Boyce | May 29, 1951 |
| 2,610,692 | Smyers et al. | Sept. 16, 1952 |
| 2,735,830 | Coover | Feb. 21, 1956 |
| 2,744,291 | Stastny et al. | May 8, 1956 |

FOREIGN PATENTS

| | | |
|---|---|---|
| 427,494 | Great Britain | Apr. 25, 1935 |